United States Patent [19]

Martin

[11] 4,146,239
[45] Mar. 27, 1979

[54] TOOL HOLDER LOCK ASSEMBLY

[75] Inventor: Kenneth R. Martin, Cincinnati, Ohio

[73] Assignee: The Warner & Swasey Company, Cleveland, Ohio

[21] Appl. No.: 860,585

[22] Filed: Dec. 14, 1977

[51] Int. Cl.² .................... B23B 29/14; B23B 29/24; B23B 31/10

[52] U.S. Cl. ................................. 279/77; 29/26 A; 82/37; 90/11 A

[58] Field of Search .............. 29/26 A, 568; 90/11 A; 408/35; 82/37; 279/76, 77

[56] References Cited

U.S. PATENT DOCUMENTS

| | | | |
|---|---|---|---|
| 300,272 | 6/1884 | Lewis | 279/76 |
| 1,784,911 | 12/1930 | Schlitters, Jr. et al. | 279/76 |
| 1,910,275 | 5/1933 | Alden | 279/77 |
| 2,128,116 | 8/1938 | Boone | 279/76 |
| 2,893,291 | 7/1959 | Hollis | 90/11 A |
| 3,369,820 | 2/1968 | Lehmkuhl et al. | 90/11 A |
| 3,727,301 | 4/1973 | Tsuzuki et al. | 29/26 A |

*Primary Examiner*—Horace M. Culver

[57] ABSTRACT

An improved lock assembly is utilized to hold a tool in a socket of a machine tool. The lock assembly includes a carriage which is movable toward and away from the socket along a path extending perpendicular to a central axis of the socket. A retaining member is pivotally supported on the carriage. Movement of the carriage toward the socket moves the retaining member from a disengaged position in which it is spaced apart from a tool disposed in the socket to an engaged position in which the retaining member abuts the tool and presses it firmly into the socket. As the carriage moves toward the socket, the retaining member rotates relative to the carriage from the disengaged position in which it is disposed at an oblique angle to the central axis of the socket to the engaged position in which it is more closely parallel to the central axis of the socket. The pivotal movement of the retaining member enables a major component of the force holding the tool in the socket to be transmitted in a direction which is parallel to the central axis of the tool to thereby maximize the component of force holding the tool in the socket.

11 Claims, 7 Drawing Figures

TOOL HOLDER LOCK ASSEMBLY

BACKGROUND OF THE INVENTION

The present invention relates to a tool holder, and more particularly to a tool holder for use in holding a cutting tool in a machine for cutting metal such as a vertical lathe.

When operating a machine tool, it is often necessary to replace the cutting tool with a different tool. This may be necessary because the tool has become dull through use or because a cutting tool having a different shape is desired. Efficient operation of the machine tool requires that the tools be quickly and easily replaced. In addition, efficient machine tool operation requires that a tool be firmly locked in place during cutting operations.

Machine tools with turrets having a plurality of cutting tools have been developed to reduce the amount of tool changing time. There are many known devices for locking tools in sockets in the turrets. Some of these involve the use of a so-called locking taper. Others use a pawl to grip the tool. Some of these devices are disclosed in U.S. Pat. Nos. 300,272; 1,784,911; 2,500,420 and 2,816,770. While each of these devices has been more or less effective, it is believed that the present invention represents a substantial improvement in terms of ease and speed of operation and tool holding capability.

SUMMARY OF THE PRESENT INVENTION

The present invention provides a new and improved tool holder lock assembly. The lock assembly is associated with a socket which receives an end portion of a tool. The end portion of the tool has a recess adapted to engage a retaining member. The retaining member is supported by a carriage which is movable along a path transverse to the axis of the socket.

As the carriage is moved forward along its path by a drive assembly, the retaining member rotates from an initial or disengaged position in which it has a central axis extending at an acute angle to the central axis of the socket to a second or engaged position in which the central axis of the retaining member is more nearly parallel to the central axis of the socket. The combination of the forward movement of the carriage and the resulting rotation of the retaining member causes the retaining member to lift the tool into the socket and to hold it in place.

The force holding the tool in the socket acts in the direction of the central axis of the retaining member. As the carriage is moved forward and the retaining member rotates from its initial or disengaged position to its second or engaged position, the component of force urging the tool into the socket increases. Simultaneously therewith, the component of force pressing the tool sidewardly against the side of the socket decreases. This enables the tool to be firmly held in place in the socket since the mechanical advantage of the retaining member increases as it moves from the initial position to the engaged position.

In addition, a tool held in a tool holder constructed according to the present invention is easy to remove from the tool holder. The tapers of the tool and socket are not locking tapers, and serve only to guide the tool into proper alignment. Consequently, when the carriage and retaining member have been disengaged from the tool, the tool may be easily removed.

The tool has a recess which receives the retaining member. This recess extends chordally across the taper of the tool. Tight engagement of the retaining member with the tool across the full length of the recess when the tool is being held in place prevents rotation of the tool in the tool holder.

Accordingly, it is an object of this invention to provide a new and improved assembly for holding a tool in the socket of a tool holder and wherein the assembly is able to quickly and easily release the tool for replacement.

It is a further object of this invention to provide a new and improved tool holding assembly as set forth in the preceding object and having a retaining member which engages a recess in an end portion of a tool to hold the tool in the tool holder.

It is a further object of this invention to provide a new and improved tool holding assembly having a rotatable retaining member which is effective to apply a force to hold a tool in socket and wherein the rotation of the retaining member enables a major component of the tool-holding force to be transmitted in a direction parallel to the central axis of the socket and only a minor component of the tool holding force to be transmitted in a direction transverse to the central axis of the socket.

BRIEF DESCRIPTION OF THE DRAWINGS

The following and other objects and features of the present invention will be understood from the following description when considered in connection with the accompanying drawings, in which.

DESCRIPTION OF ONE SPECIFIC PREFERRED EMBODIMENT OF THE INVENTION

Figure 1:
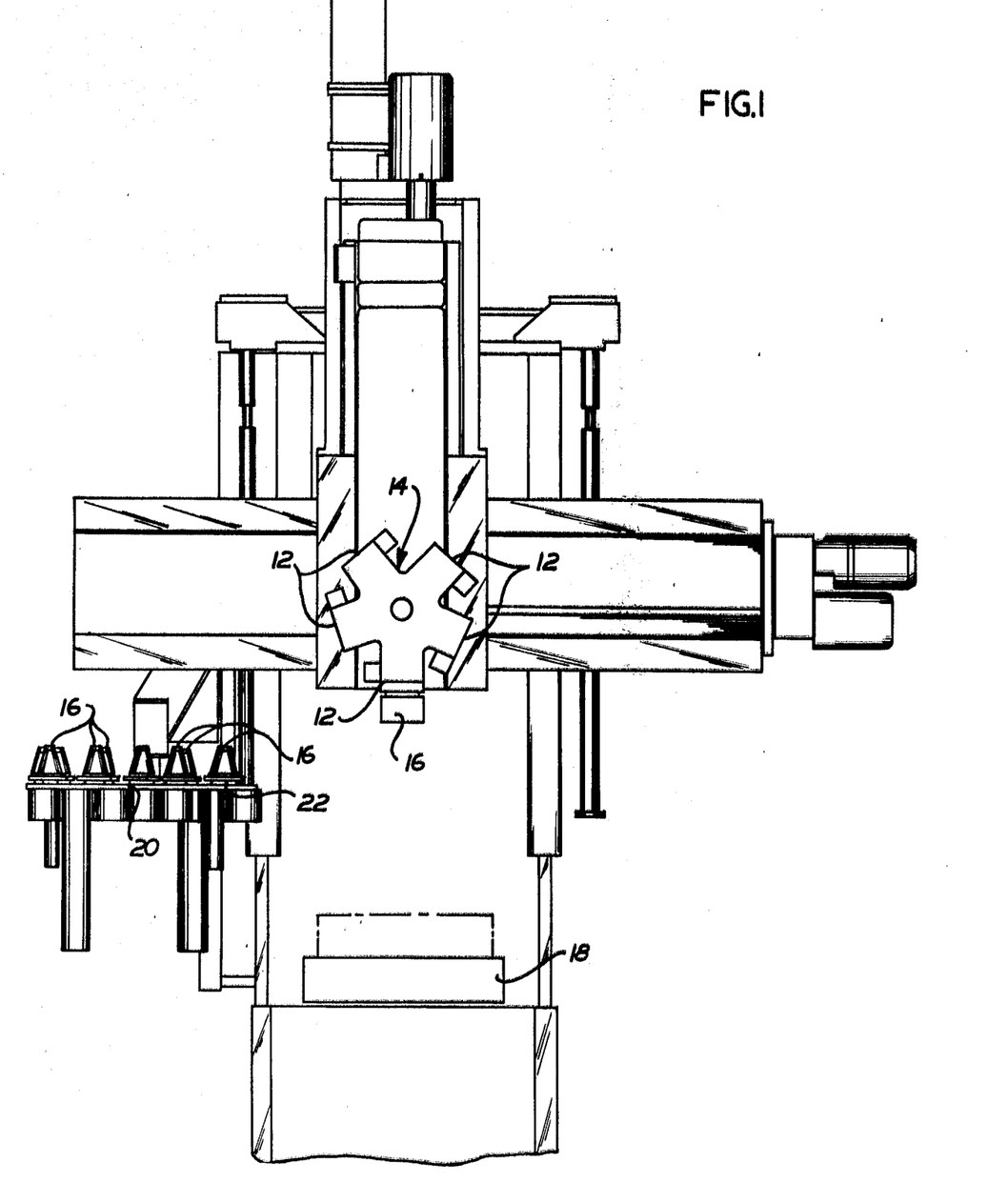
FIG. 1 is an illustration of a machine tool having tool holders constructed according to the present invention.

A machine tool 10 includes a plurality of tool holders 12 mounted on a rotatable turret 14 (FIG. 1). A tool 16 is disposed in one of the tool holders 12. The turret 14 is movable horizontally and vertically with respect to the rotating machine head 18 to shape the workpiece (shown in phantom) as desired.

Mounted on the machine tool 10 and to the side of the machine head 18 is a carousel 20 having a plurality of grippers 22 for releasable tools 16 in a circular array. When it is necessary to change the tool 16 in the tool holder 12, the turret 14 is moved away from the workpiece to a loation above the carousel 20. The turret 14 is then lowered until the tool engages an empty gripper 22. The tool holder 12 then releases the tool 16. The gripper 22 then engages the tool 16 and the turret 14 moves upward away from the carousel 22 while the disengaged tool 16 remains on the carousel 22. By rotating the carousel 20 until a desired tool 16 is located under the turret 14 and reversing the above process, the desired tool may be engaged by the turret.

Each of the tool holders 12 includes a conical or tapered socket 26 (FIG. 2) for receiving the conical or tapered end portion 28 of a tool 16. In accordance with a feature of the present invention, an improved lock assembly 29 is utilized to hold the tool 16 firmly in the socket 26. The lock assembly 29 includes a carriage 30 which moves along a path extending transverse to the central axis of the tapered socket 26. The carriage 30 supports a retaining or lock member 32 which engages the tool 16 to hold it in the socket 26.

Figure 2:
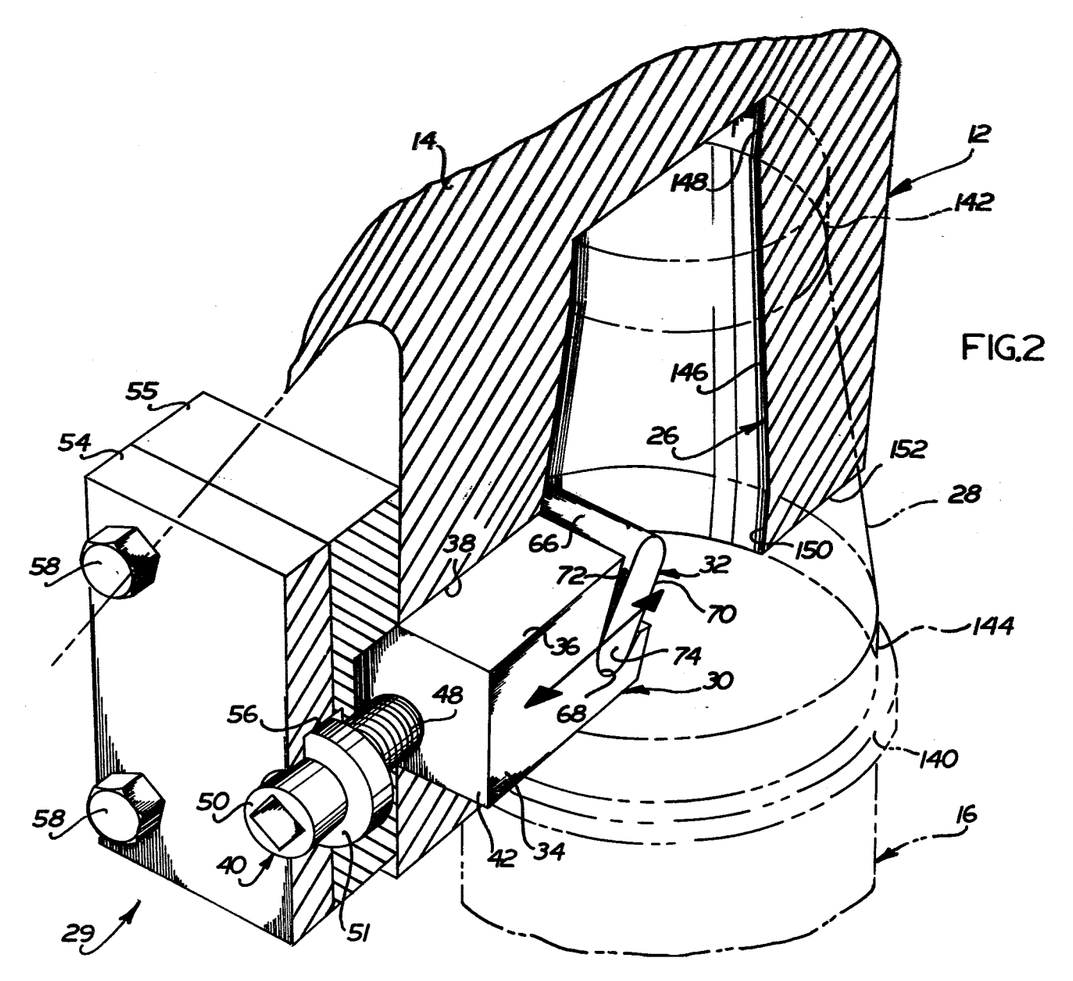
FIG. 2 is a fragmentary pictorial view of one of the tool holders of FIG. 1.

The generally rectangular carriage 30 has four parallel side surfaces, only the side surfaces 34 and 36 can be seen in FIG. 2, which are disposed in sliding abutting engagement with corresponding surfaces forming a rectangular passage 38 in the turret 14. The passage 38 enables the carriage 30 to slide toward and away from the socket 26 and supports the carriage against sidewise movement.

Figure 3:
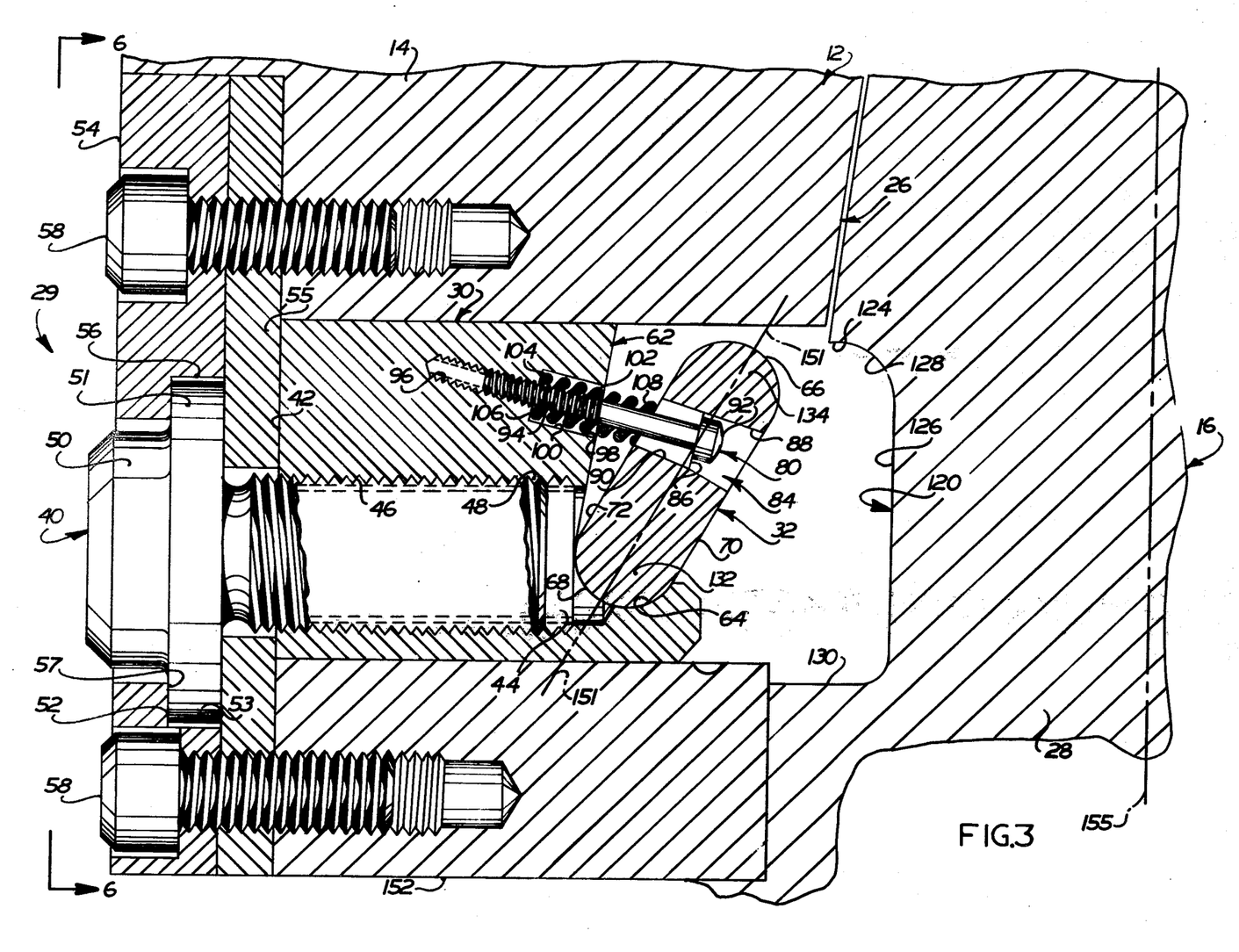
FIG. 3 is a sectional view of the tool holder of FIG. 2, showing a retaining member disengaged from the tool.

Rotating an externally threaded drive member 40 by any suitable means causes the carriage 30 to move in the passage 38 toward or away from the socket 26 (FIGS. 2 and 3). An end surface 42 of the carriage 30 is perpendicular to the four side surfaces 34 and 36 (two not shown) of the carriage. A cylindrical passage 44 extends into the carriage 30 from the end surface 42. The passage 44 has a central axis which extends parallel to the path of the carriage. The passage 44 has internal helical thread convolutions 46 which cooperate with external helical thread convolutions 48 on the drive member 40.

A head end portion 50 of the drive member 40 is held against axial motion relative to the tool holder 12. The head end portion 50 has a circular flange or projection 51 which is integrally formed with the threaded shank of the drive member 40. The flange 51 has a pair of axially spaced apart and generally parallel annular end surfaces 52 and 53.

The flange 51 on the head end 50 of the drive member 40 is held against axial motion relative to the tool holder 12 by inner and outer retaining plates 54 and 55. The outer retaining plate 54 has a recess 56 having an annular end surface 57 which abuts the end surface 52 of the cylindrical flange 51. The contact between surfaces 52 and 57 prevents axial motion of the head end portion 50 of the drive member 40 in one axial direction relative to the tool holder 12. Contact between the inner retainer plate 55 and the end surface 53 of the flange 51 prevents axial motion of the drive member 40 relative to the tool holder 12 in the other axial direction. The two retaining plates 54 and 55 are secured to the tool holder 12 by any suitable means. In the preferred embodiment, machine screws 58 are used for this purpose.

Although the drive member 40 is held against axial movement, it is free to rotate relative to the turret 14. When the drive member 40 is rotated, the cooperation between the threads 48 on the drive member 40 and the threads 46 in the passage 44 causes the carriage 30 to move along its path in the passage 38.

The end portion 62 of the carriage 30 opposite end 42 pivotally supports the retaining member 32. In cross section this end portion 62 of the carriage 30 has a generally L-shaped configuration. The longer side of the "L" extends vertically downward from the top surface 36 of the carriage (as viewed in FIGS. 3–5). The shorter leg of the L-shaped end portion 62 extends to the right (as viewed in FIGS. 3–5) and has an arcuate surface 64 which rotatably supports the retaining member 32.

The retaining member 32 has a pair of symetrically disposed semicircular end surfaces 66 and 68 connected by a pair of parallel rectangular major side surfaces 70 and 72 and a pair of parallel oval end surfaces 74 (only one of which is shown in FIG. 2). The semicircular end surface 68 conforms to the shape of the arculately curved surface 64 on the end portion 62 of the carriage 30. This enables the retaining member 32 to rotate about the axis of revolution of the semicircular end 68 of the retaining member.

A machine screw 80 serves to limit the rotation of the retaining member 32 in a direction away from the end face 62 of the carrier 30. The machine screw 80 extends through a passage 84 in the retaining member. The passage 84 has a generally oval cross sectional configuration. Near the longitudinal center of the passage 84, the cross sectional size changes at a shoulder 86. The generally oval shoulder 86 is disposed at the junction between a portion 88 of the passage 84 having a relatively large cross sectional area with a portion 90 having a smaller cross sectional area. The shoulder 86 functions as a stop surface to engage the circular head portion 92 of the screw 80. When the retaining member 32 has moved to the position shown in FIG. 3, abutting engagement between the shoulder 86 and the head portion 92 of the screw 80 prevents further motion of the retaining member.

The threads of the machine screw 80 are engaged by a threaded portion 96 of a cylindrical passage 98 in the carriage 30. The second portion 100 of the cylindrical passage 98 in the carriage 30 is of larger diameter than the outside diameter of the machine screw 80 and communicates with the surface of the end face 62 of the carriage 30.

The retaining member 32 is continuously urged toward this forward position shown in FIG. 3 by a helical spring 102 disposed around the machine screw 80. One end 104 of the spring 102 abuts an annular surface 106 at the end of the cylindrical passage 98 in the carriage. The opposite end 108 of the spring 102 abuts the surface 72 of the retaining member. The spring 102 assures that the retaining member 32 will be in the proper position to engage the tool 16.

Figure 7:
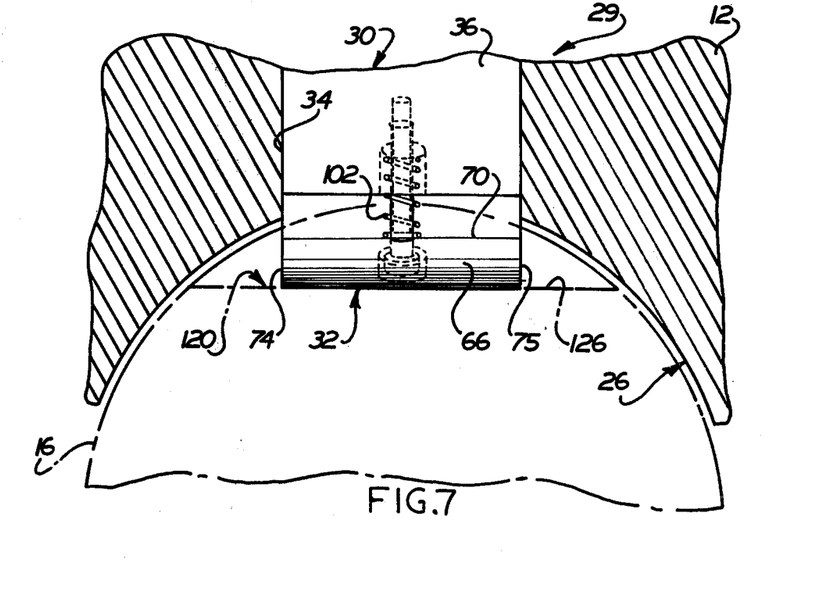
FIG. 7 is a sectional view, taken along the line 7—7 of FIG. 6 and showing the retaining member in the recess in the tool.

The tool 16 is adapted to receive the retaining member 32 (FIGS. 3 and 7). A recess 120 extends chordally across the tapered end portion 28 of the tool 16. The tool recess 120 has a flat upper surface 124 (FIG. 3) extending in a plane perpendicular to the central axis of the end portion 28 of the tool 16. The upper surface 124 is connected with a generally flat rear surface 126 by a curved portion 128 which is adapted to cooperate with the second semicircular end portion 66 of retaining member 32. A lower surface 130 is parallel to the upper surface 124 and connects the rear surface 126 of the recess 120 with the tapered surface end portion 28 of the tool 16.

Figure 4:
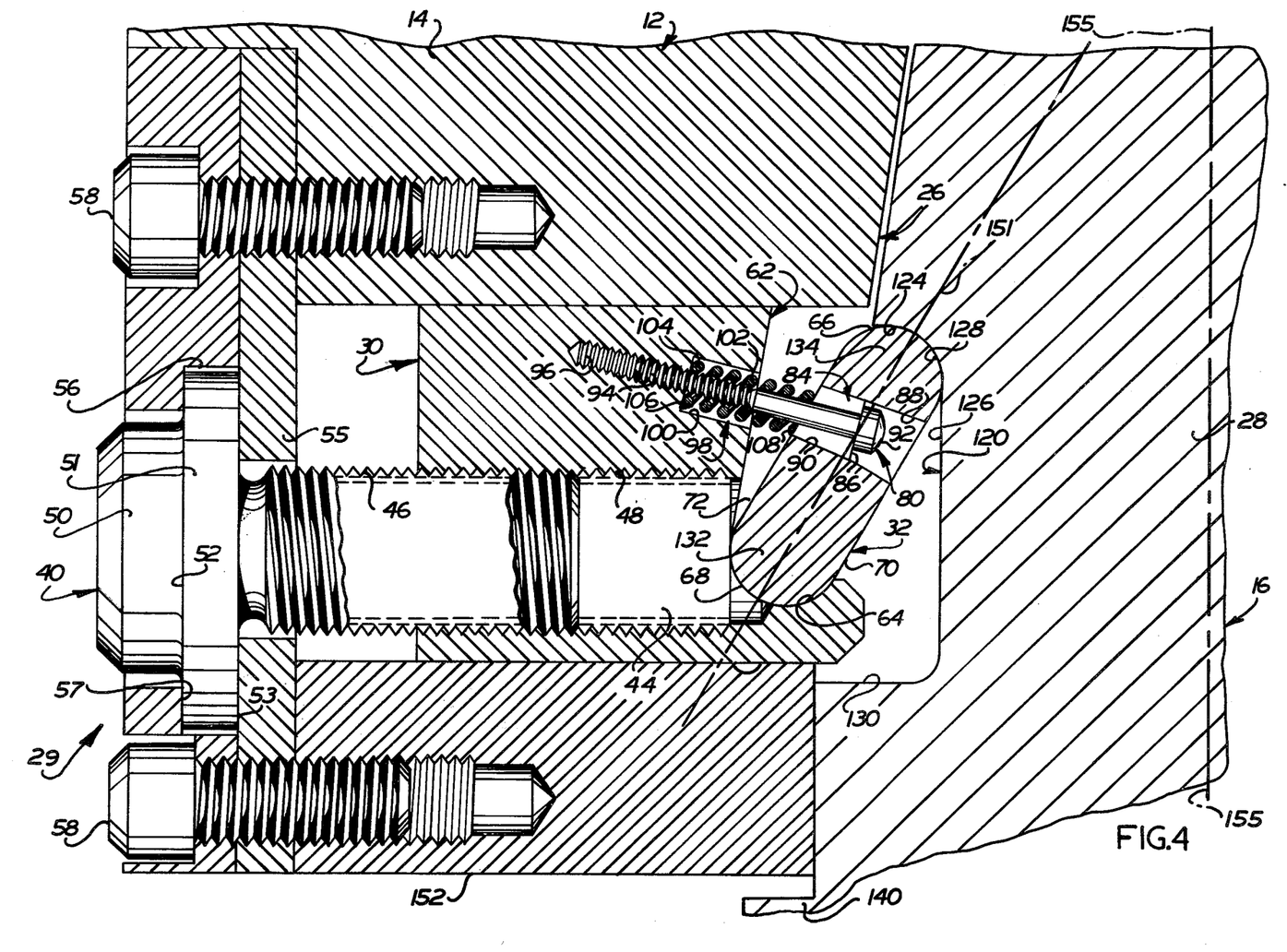
FIG. 4 is a sectional view of the tool holder of FIG. 2 showing the retaining member after it has been moved forward to make initial contact with the tool.

Forward motion of the carriage 30 causes the retaining member 32 to engage the recess 120 in the tool 16. (FIG. 4). As the carriage 30 is moved forward, the retaining member 32 contacts either the rear surface 126 of the tool recess 120 or simultaneously contact the rear surface 126 and the curved portion 128 of the tool recess, depending on the exact axial location of the tool 16 in the tool holder 12.

Figure 5:
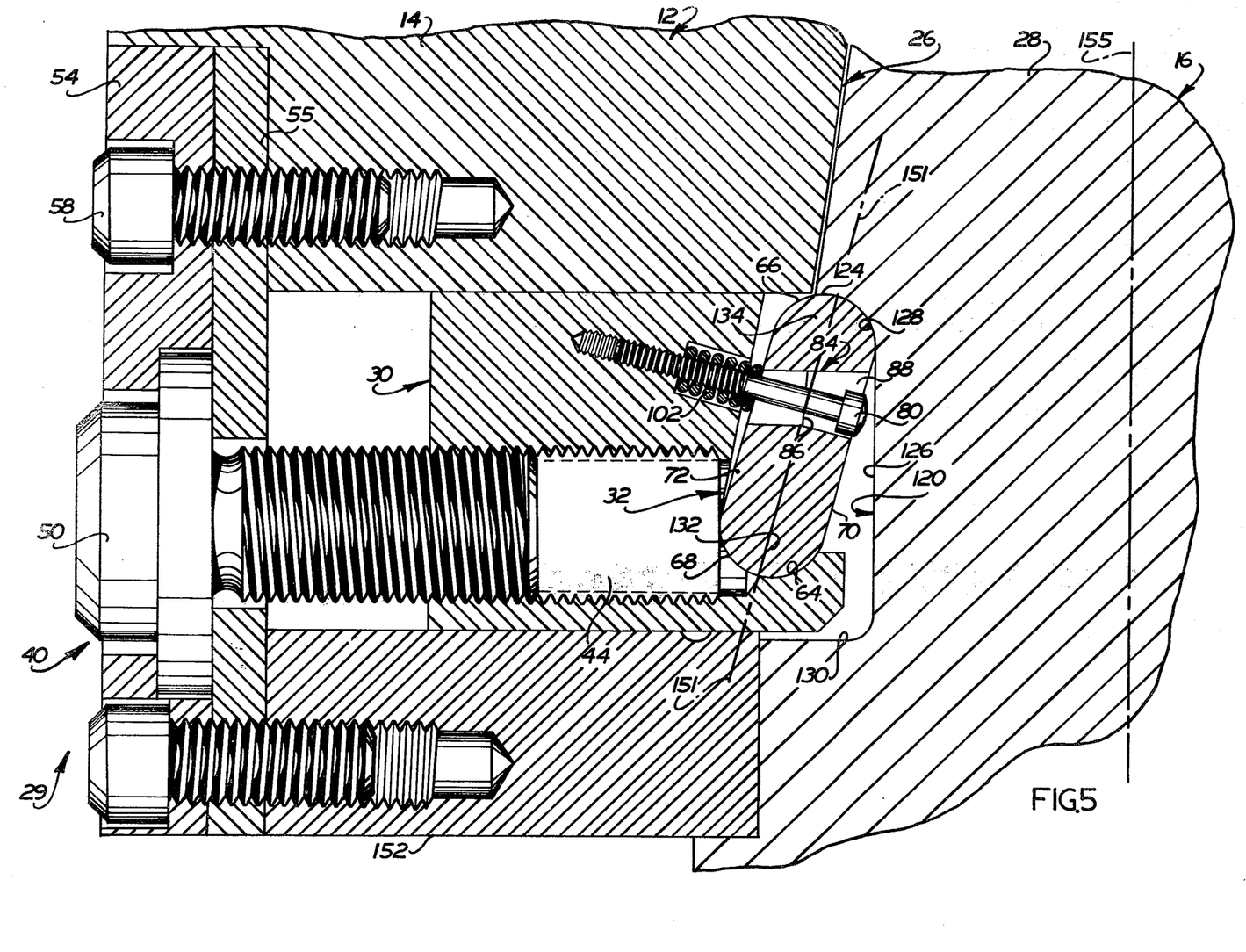
FIG. 5 is a sectional view of the tool holder of FIG. 2 showing the retaining member in an engaged or locking position firmly holding the tool in place.
Figure 6:
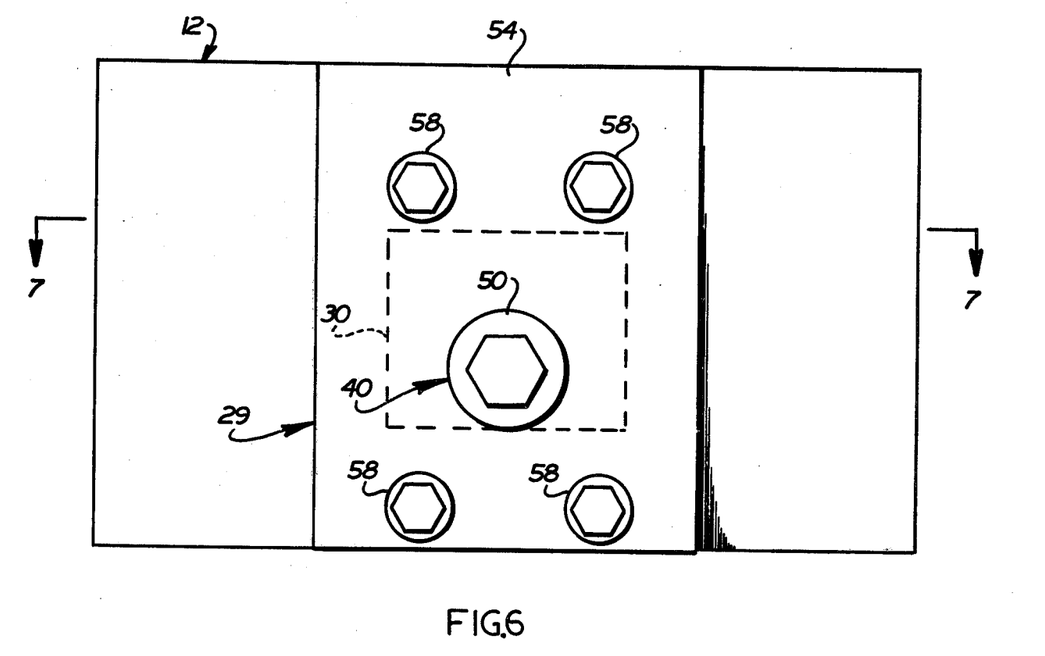
FIG. 6 is an elevational view taken on a reduced scale along the line 6—6 of FIG. 3.

After the retaining member 32 has engaged the curved portion 128 of the recess 120 in the tool 16, further forward motion of the carriage 30 will lift the tool 16 into the socket 26 and hold it in place (FIG. 5). The forward motion of the carriage 30 causes the upper end 134 of the retaining member 32 to rise as the retaining member pivots in a counterclockwise direction (as viewed in FIGS. 4 and 5). This lifts the tool 16 into the socket 26. When the tool 16 has been pressed into place in the socket 26, an annular collar 140 (FIG. 2) on the tool engages a bottom surface 152 to prevent further motion of the tool. The retaining member 32 is then effective to hold the tool in place (FIGS. 2 and 5).

When the carriage 30 is first brought towards the tool 16 by rotation of the drive screw 40, the action of the spring 102 assures that the retaining member 32 is in the forward position (FIG. 3). In this position a central axis 151 forms an acute angle with the central axis of the tapered socket 26. The central axis 151 extends parallel to the sides 70, 72 and ends 74 and 75 of the retaining member 32 and extends through the centers of the semicircular ends 66 and 68 of the retaining member. At this time, the vertical distance (as viewed in FIG. 3) between the uppermost part of the semicircular end 66 and the lowermost part of the semicircular end 68 is at a minimum.

As the forward motion (to the right in FIGS. 3-5) of the carriage 30 continues, the retaining member 32 slides up the wall surface 126 of the recess 120 (FIG. 4) until there is abutting contact between the semicircular end portion 66 of the retaining member and the curved portion 128 of the recess. This is accompanied by pivotal sliding movement of the semicircular end 68 of the retaining member 32 against the curved surface 64.

The contact between the curved part 64 on the end 62 of the carriage 30 and the lower (as viewed in FIGS. 3-5) semicircular end 132 of the retaining member 32, forces the lower end of the retaining member to move forward as the carriage moves. However, the contact between the curved portion 128 of the recess 120 in the tool 16 and the semicircular surface 66 of the upper end portion 134 of the retaining member 32 prevents the upper end of the retaining member from moving forward once the tool 16 has been firmly seated in the socket 26 (see FIG. 5). Continued application of forwardly directed drive forces to the carriage 30 creates forces acting through the contacts between the carriage and the retaining member 32 and the tool 16. These forces tend to rotate the retaining member 32 about an axis coincident with the axis of revolution of the lower semicircular end 68 of the retaining member thus pressing the upper semicircular end 66 of the retaining member 32 against the tool 16.

The end portion 23 of the tool includes two coaxial cylindrical surfaces 142 and 144 (FIG. 2) connected by a tapering surface 146. The tapering surface 146 guides the tool 16 into the tool holder 12 as the turret 14 is lowered over tool thus enabling the tool holder to engage the tool even when the end portion 28 of the tool and the socket 26 in the tool holder are slightly misaligned. Two cylindrical surfaces 148 and 150 adjoining opposite ends of the tapered portion 146 of the socket 26 cooperate with the corresponding cylindrical surfaces 142 and 144 on the end portion 28 of the tool 16 to assure perfect alignment of the tool in the socket when the tool is held in the socket.

Once the tool 16 is in the socket 26 far enough for the retaining member 32 to engage the recess 120 in the tool, the carriage 30 is brought forward (to the right as viewed in FIG. 3). Upon the occurrence of initial contact of the retaining member 32 with the groove 120 in the tool end portion 28, the central axis 151 intersecting the center of each curved end portion 66 and 68 of the retaining member 32 extends an oblique angle to the central axis 155 of the socket 26 (FIG. 4). As the carriage 30 moves forward, the tool 16 is forced into the socket 26 and the lower end 132 of the retaining member 32 moves more nearly into vertical alignment with the upper end 132 of the retaining member (FIG. 5).

When the annular collar 140 is abutting the stop surface 152, further upward motion of the tool 16 into the tool holder 12 is resisted. Because the retaining member 32 is now nearly parallel to the central axis of the socket 26, a large upward component of force is transmitted from the retaining member 32 to the tool 16 (see FIG. 5). Only a small sidewise force is applied to the tool 16 by retaining member 32. At this time, the holding force applied to the carriage by the drive screw 40 is equal to the very small sidewise forces applied to the tool.

The retaining member 32 also holds the tool 16 against rotation in the socket 26 (FIG. 7). The contact between the retaining member 32 and the tool 16 is along a surface which is transverse to the central axis of the socket 26. Rotation of the tool 26 in the socket 26 would make the upper end surface 66 of the retaining member 32 no longer parallel to the recess 120 in the tool and tend to force the retaining member away from the tool. The force applied by the drive screw 40 through the carriage 30 to the retaining member 32 prevents the retaining member from moving away from the recess 120 in the tool 16. Thus, when the retaining member 32 has been moved forward into engagement with the tool recess 120, the rotation of the tool is prevented.

From the foregoing it is apparent that the present invention provides a new and improved tool lock assembly 29 (FIG. 2). A socket 26 having two coaxial cylindrical surfaces 148 and 150 connected by a tapering guide surface 146 receives a similarly shaped end portion 28 of a tool 16. The end portion 28 of the tool 16 has a recess 120 adapted to receive a retaining member 32 supported by a carriage 30 which is movable along a path transverse to the axis of the socket 26 (FIG. 3).

As the carriage 30 is moved forward along its path by a drive screw 40, the retaining member 32 rotates from an initial position (FIG. 4) in which it has a central axis forming an acute angle with the central axis of the socket 26 to a second position in which the same central axis of the retaining member is more nearly parallel to the central axis of the socket (FIG. 5). This rotational motion is caused by the forward movement of the carriage 30 and the engagement of the retaining member 32 with the recess 120 in the tool. The combination of the forward movement of the carriage 30 and the resulting rotation of the retaining member 32 causes the retaining member to lift the tool 16 into the socket 26 and to hold it in place.

The tool holding force acts in the direction of the central axis 151 of the retaining member 32. As the carriage 30 is brought forward and the retaining member 32 rotates from its initial position to its second position, the component of the tool-holding force acting in the direction of the drive screw 40 decreases as a percentage of the total tool holding force. Simultaneously the component of the tool holding force acting perpendicular to the drive screw 40 increases as a percentage of the total tool-holding force. Thus it is possible to hold the tool 16 very tightly since the mechanical advantage of the machine screw 40 increases the more tightly it grips the tool in the socket 26.

In addition, a tool 16 held in a tool holder 12 constructed according to the present invention is easy to remove from the tool holder (FIG. 2). The tapers 146 and 28 of the tool 16 and socket 26 are not locking tapers, they serve only to guide the tool into proper alignment. Consequently, when the carriage 30 and retaining member 32 have been disengaged from the tool, the tool 16 may be easily removed. The recess 120 which receives the retaining member 32 extends chordally across the taper 122 of the tool 16 (FIGS. 3 and 7). The tight engagement of the retaining member 32 with the tool 16 across the full length of the recess 120 when the tool is being held in place prevents rotation of the tool in the tool holder 12.

What is claimed is:

1. An assembly for use in holding a tool, said assembly comprising a tool holder having a socket, the tool having an end portion adapted to be received in said socket, a retaining member having a first end portion supported against motion parallel to the central axis of the socket and a second end portion adapted to engage said tool, said retaining member being movable relative to said tool holder between a first position in which said retaining member is ineffective to urge said tool into said socket and a second position in which said retaining member is effective to urge said tool into said socket, said retaining member having a central axis intersecting said first and second end portions, said central axis being disposed transverse to the central axis of said socket when said retaining member is in the first position and more nearly parallel to the central axis of said socket when said retaining member is in the second position, and actuator means for effecting movement of said retaining member from the first position to the second position to apply force to said tool to hold said tool in said socket and to tend to maximize a component of the tool-holding force extending parallel to the central axis of said socket and to tend to minimize a component of the tool-holding force extending transversely to the central axis of said socket.

2. An assembly as set forth in claim 1 wherein said actuator means includes a movable carriage engaging said first end portion of said retaining member, said carriage being movable toward the socket to move the retaining member from the first position to the second position.

3. An assembly as set forth in claim 2 wherein said actuator means is effective to move said carriage along a path having an axis transverse to the central axis of said socket.

4. An assembly as set forth in claim 1 wherein said actuator means includes a movable carriage engaging said first end portion of said retaining member and externally threaded drive means for causing movement of said carriage relative to said tool holder upon rotation of said drive means, said drive means having an outer end portion which is held against axial movement relative to said tool holder and an externally threaded inner end portion adapted to cooperate with an internally threaded passage in said carriage.

5. An assembly as set forth in claim 1 further including spring means for continuously urging said retaining member toward said first position.

6. An assembly as set forth in claim 1 wherein said end portion of said tool adapted to be received in said socket has surface means for engaging said retaining member, said surface means defining a recess extending transverse to the central axis of said end portion of said tool, said retaining member being disposed in abutting engagement with said recess when said retaining member is in the second position and said retaining member being effective to hold said tool against rotation relative to said tool holder when said retaining member is in the second position.

7. An assembly as set forth in claim 1 wherein said retaining member is rotatable with respect to said tool holder, said assembly further including adjustable stop means for limiting the arcuate distance between the first position of said retaining member and the second position of said retaining member.

8. An assembly as set forth in claim 1 wherein said socket includes a conical section, said end portion of said tool including a conical section cooperating with said conical section of said socket to guide said tool into alignment with said socket, said socket including a stop surface, said tool including a stop surface to abut said stop surface on said socket to limit motion of said tool in said socket in a first axial direction.

9. An assembly as set forth in claim 8 wherein said tool includes surface means for engaging said second end portion of said retaining member when said retaining member is in said second position to limit axial motion of said tool in said socket in a second axial direction.

10. An assembly for use in holding a tool in a tool holder, said assembly comprising a tool holder having an axially extending socket adapted to receive an end portion of a cutting tool, a retaining member having a first end portion supported against motion parallel to the central axis of the socket and a second end portion adapted to engage the tool, said retaining member being movable between first and second positions, said retaining member having a central axis intersecting said first and second end portions and being disposed transverse to the central axis of the socket when said retaining member is in the first position and more nearly parallel to the central axis of the socket when said retaining member is in the second position, and actuator means for effecting movement of said retaining member between the first position where said retaining member is ineffective to urge the tool into the socket and the second position where the retaining member is effective to urge the tool into the socket by applying force to the tool to hold the tool in the socket, the force applied to the tool by the retaining member having a direction generally coincident with the axis intersecting said end portions of said retaining member regardless of whether said retaining member is in the first position or in the second position and a magnitude varying from a minimum when said retaining member is in the first position to a maximum when said retaining member is in the second position.

11. An assembly as set forth in claim 10 wherein said actuator means includes a carriage which engages the first end portion of said retaining member, said carriage being movable toward the central axis of the socket to move the retaining member from the first position to the second position.

* * * * *